No. 613,571. Patented Nov. 1, 1898.
A. DE ST. HUBERT.
MACHINE FOR SEPARATING WOOL OR OTHER FIBROUS MATERIALS.
(Application filed Jan. 6, 1898.)
(No Model.) 2 Sheets—Sheet 1.
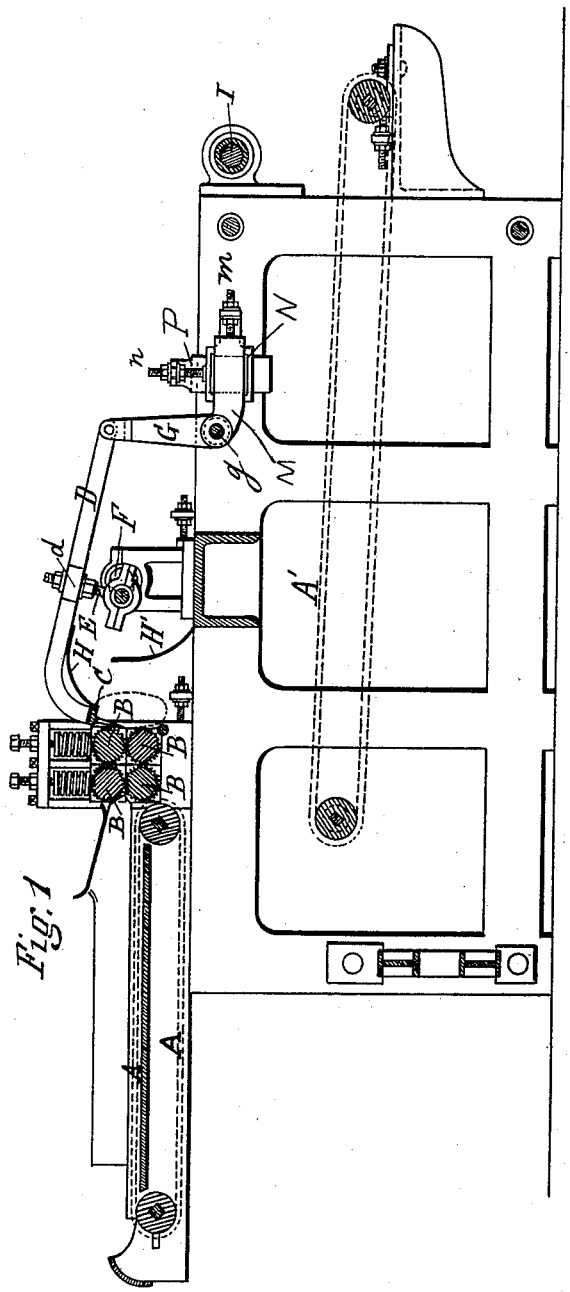
WITNESSES:
F. W. Wright.
H. C. Abbe.
INVENTOR
ACHILLE DE SAINT HUBERT
BY
Howson and Howson
HIS ATTORNEYS No. 613,571.  
A. DE ST. HUBERT.  
MACHINE FOR SEPARATING WOOL OR OTHER FIBROUS MATERIALS.  
(Application filed Jan. 6, 1898.)  
(No Model.)  
Patented Nov. 1, 1898.  
2 Sheets—Sheet 2.
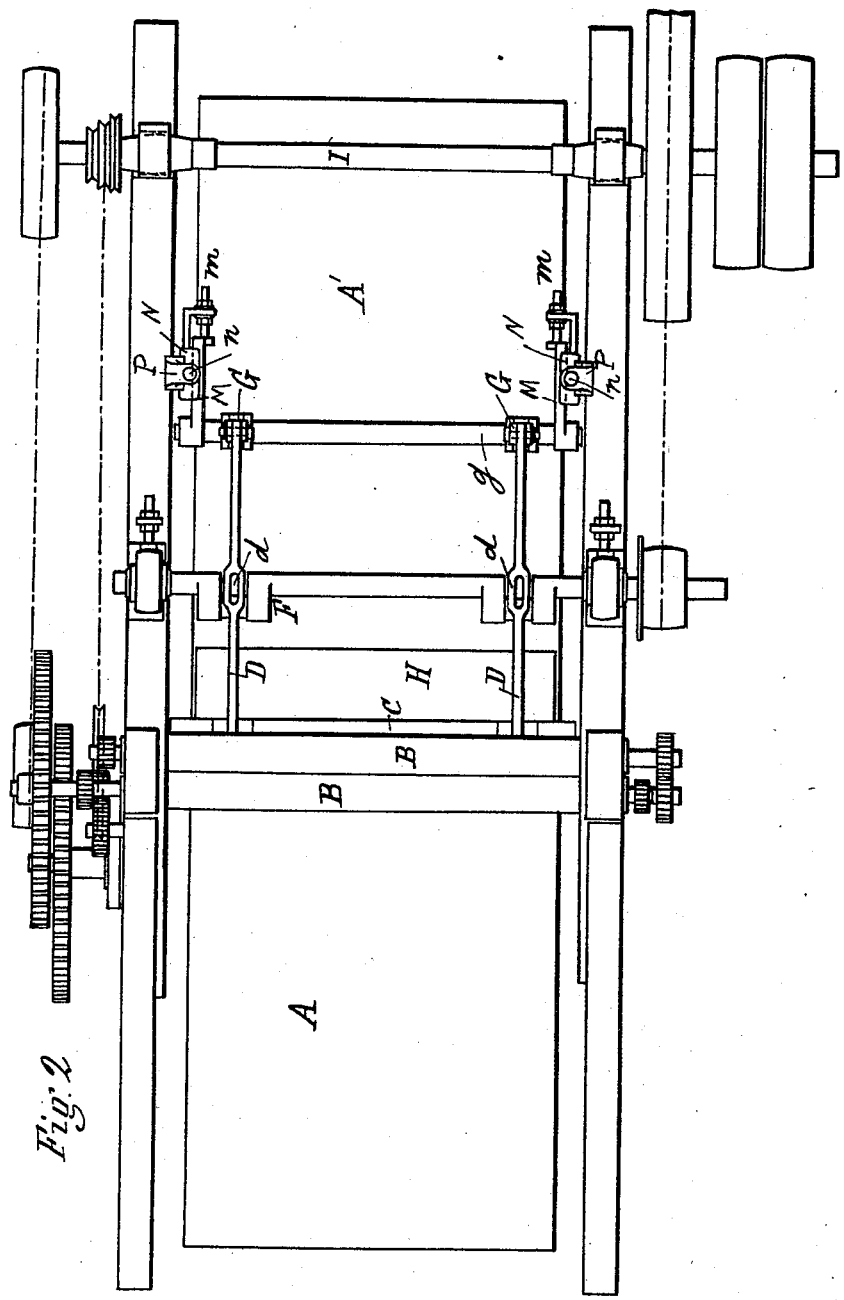

UNITED STATES PATENT OFFICE.

ACHILLE DE ST. HUBERT, OF BIERGES, BELGIUM.

MACHINE FOR SEPARATING WOOL OR OTHER FIBROUS MATERIALS.

SPECIFICATION forming part of Letters Patent No. 613,571, dated November 1, 1898.

Application filed January 6, 1898. Serial No. 665,843. (No model.)

*To all whom it may concern:*

Be it known that I, ACHILLE DE ST. HUBERT, manufacturer, of Bierges, Belgium, have invented a Machine for Separating Wool or other Fibrous Materials, (for which I have obtained Letters Patent in Belgium, No. 129,264, dated July 5, 1897, and No. 130,415, dated September 1, 1897; in France, No. 268,662, dated July 12, 1897, and in Germany, No. 97,795, dated August 13, 1897,) of which the following is a specification.

As its name indicates, the machine which is the object of the present invention is for the purpose of separating wool too strongly felted together without tearing it—that is to say, retaining the full length of fiber, and consequently its value.

In the accompanying drawings, Figure 1 is a longitudinal section of the machine, and Fig. 2 is a plan view of the same.

The wool to be separated is placed on an endless apron A, which presents it to grooved rollers B, which draw it in and hold it while the separation goes on. Experience has shown that it is necessary to have two pairs of these rollers moving at the same speed by connecting them by gearing. In front of these rollers rapidly moves a comb C, consisting of a bar carrying one or several rows of sharp teeth and moving in an ellipse. In order to obtain this movement, I mount the comb on two bars D, worked by the rods E and the bent shaft F or eccentrics, while the ends of these bars describe a circular arc, owing to the levers G, jointed at $g$.

In order to be able to regulate the stroke of the comb C to suit the character of the wool or other material treated, the bars D have slots $d$, so that the point where they are acted on by the rods E may be varied, and the axis $g$ of the two levers G G is made adjustable. For this purpose the axis $g$ is mounted in the supports M, horizontally adjustable in slides N by means of regulating-screws $m$, and the slides N are vertically adjustable on guides P on the frame by means of the regulating-screws $n$. By these means the stroke of the comb can be varied at pleasure within certain limits.

The wool or other material separated by the comb C falls on an endless apron A', which carries it to the rear of the machine, to be taken thence to be further operated on.

In order to clear the comb from material which may adhere to it, I employ the following arrangement: To the under side of the bars D, I fix near the comb C a curved sheet or plate H, which extends across the width of the machine and moves with the comb. Opposite this curved plate I mount upon the frame a stationary curved plate H' of the same length as the first and having its convex side toward the comb. The first-mentioned plate by its elliptical movement throws a current of air against the deflecting-plate H', which produces an eddy or reacting current sufficient to blow off the comb the fibers which would otherwise adhere to it.

In order to prevent the material on the table A' from becoming caught by the shaft I, I surround the shaft with a sleeve fixed to the frame.

I claim as my invention—

1. A machine for separating wool or other fibrous materials, comprising a feed-apron, grooved rollers and a comb adjacent to said rollers, with means for giving the comb an elliptical movement, and two air-deflecting plates, one carried by the comb and the other an adjacent stationary plate, substantially as described.

2. In a machine for separating wool or other fibrous materials, the combination of rollers and a comb to coöperate therewith, a crank or eccentric F, its rods E, bars D carrying the comb and having slots $d$ and the radius-levers G, with horizontally and vertically adjustable slides, on which said levers are pivoted, substantially as and for the purpose set forth.

In testimony whereof I have signed my name to this specification in the presence of two subscribing witnesses.

ACHILLE DE ST. HUBERT.

Witnesses:
   E. NUYTS,
   GUS A. TIERNEY.